Dec. 18, 1934. E. BANDOLY 1,984,819
THERMOMETER AND METHOD OF MAKING THE SAME
Filed May 13, 1932
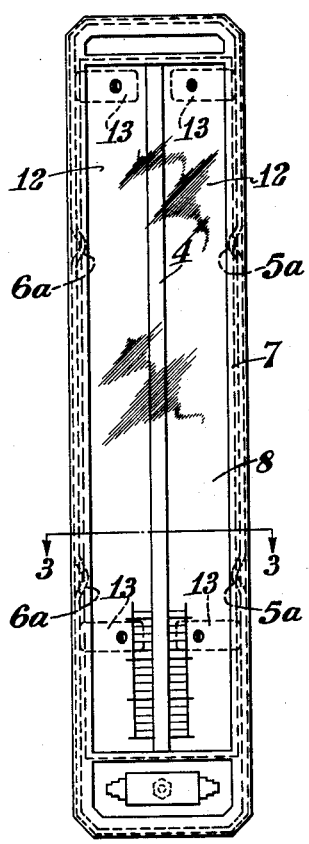
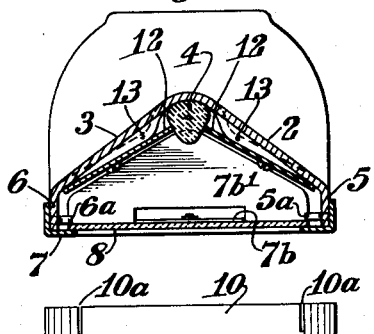
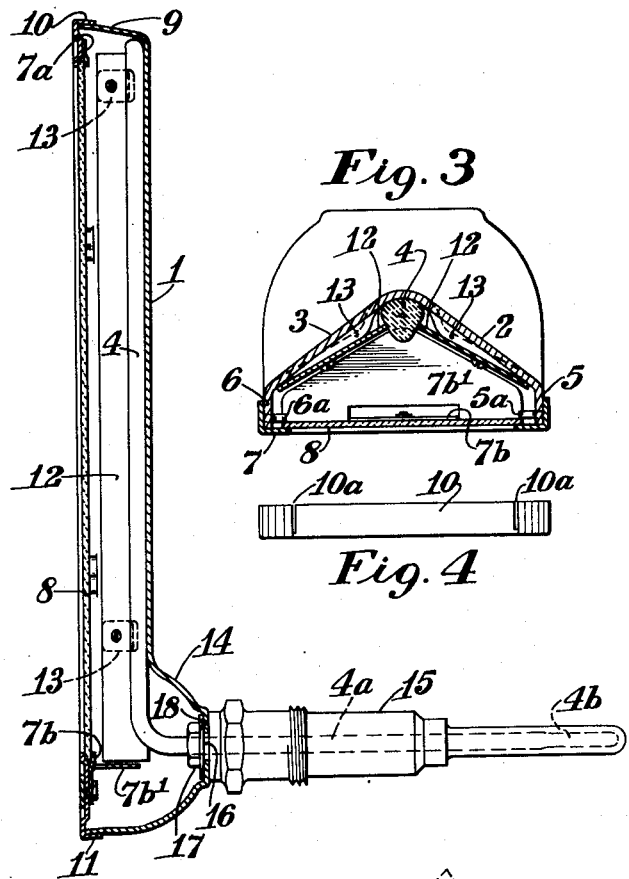
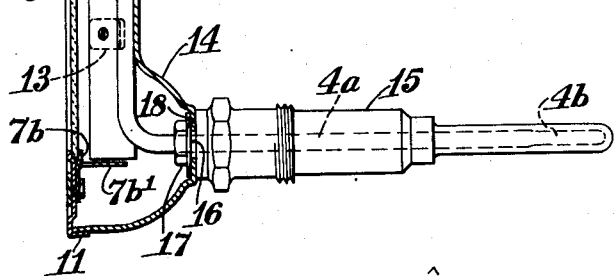
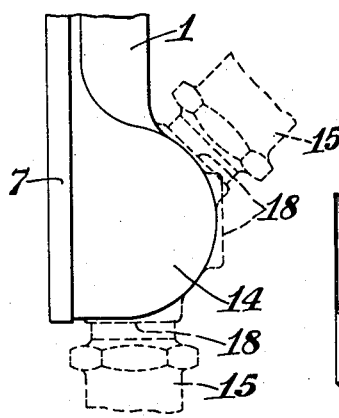
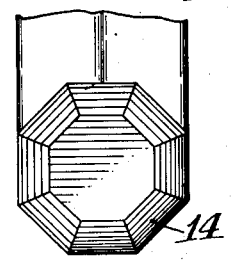
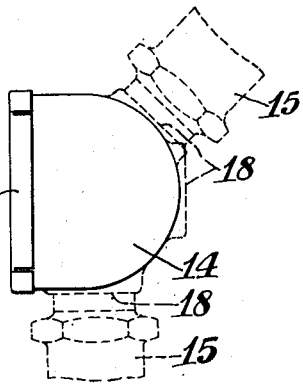
INVENTOR
Erich Bandoly
BY D. Clyde Jones
ATTORNEY Patented Dec. 18, 1934

1,984,819

UNITED STATES PATENT OFFICE 1,984,819

THERMOMETER AND METHOD OF MAKING THE SAME

Erich Bandoly, Rochester, N. Y., assignor to Instrument Companies, Rochester, N. Y., a corporation of New York Application May 13, 1932, Serial No. 611,143

11 Claims. (Cl. 29—148)

This invention relates to thermometers and more particularly to angle type thermometers and the method of making the same.

Since thermometer bulb chambers are mounted at various positions, it is necessary to incline the thermometer scale case at various angles with respect thereto in order to bring the graduated scale in the line of vision. This inclination may assume any one of a large number of angles in a plane perpendicular to the thermometer front, and in addition at various positions with respect to this plane to adapt the thermometer for right and left hand installations.

In the past it has been customary to provide a different design of thermometer scale case for each different inclination or angular relation of the case with respect to the bulb chamber. This practice in addition to the expense of numerous molds for the large number of required designs, has necessitated a supply of each design of case, since any given case could be used only in connection with a particular inclination or angular position of the bulb chamber with respect to the case.

In accordance with the present invention, it is proposed to provide a thermometer scale case which is suitable for manufacture into any one of a large number of possible angle type thermometers.

An additional feature of the invention includes a scale case which is punched or stamped from sheet metal and which may thereafter be further formed for use into any type of angle thermometer.

A further feature of the invention resides in a thermometer front which is firmly held on the scale case and yet may be readily disengaged therefrom without removing any screws or bolts.

Still another feature of the invention relates to the novel method of making thermometers including those of the so-called angle type.

These and other features of the invention will appear from the detailed description and claims when taken with the drawing, in which Fig. 1 is a front elevation of the improved thermometer of the present invention; Fig. 2 is a side elevation of a right angle thermometer with portions of the scale case and thermometer front in section to show the cooperation of these parts and to indicate the mounting of the graduated scale plates; Fig. 3 is a sectional view with the bulb chamber omitted, taken on the line 3—3 of Fig. 1 looking in the direction of the arrows; Fig. 4 is a top view of the thermometer front; Fig. 5 is a fragmentary view of a thermometer case at one stage in its manufacture, with its contour indicated in dotted lines, showing how it may be formed to support a bulb chamber at any one of three different angles; Fig. 6 is a similar top view of the thermometer case showing in dotted lines how it may be formed to support the bulb chamber in a plane perpendicular to the thermometer front and also at other inclinations with respect thereto; and Fig. 7 is a fragmentary view of a thermometer case which has at its lower end, a bulb chamber supporting portion of somewhat different contour from those shown in the previous views.

With reference to the drawing, 1 designates a thermometer scale case which is V-shaped in cross section (Fig. 3) as defined by the inclined rear surfaces 2 and 3 forming a trough to receive a thermometer tube 4. The rear surfaces 2 and 3 terminate in flat sides 5 and 6 to be engaged by the side flanges of the frame 7 of the thermometer front which supports a protective glass 8. A fixed clip 7a and a detachable clip 7b hold the glass in the frame. As illustrated, the clip 7b, which is attached to the lower part of the front frame 7, is provided with a triangular extension 7b' in a plane perpendicular to and extending to the scale plates for the purpose of closing the lower end of the tube chamber in the case. Since the clip 7b is detachable a broken glass 8 may be replaced without the use of solder as in former thermometers. The top of the case generally inclines upwardly as shown at 9 (Fig. 2) to be engaged by the upper flange 10 of the front frame 7, and the lower edge of the case inclines downwardly to be engaged by the lower flange 11 of the frame. These upper and lower flanges which conform to the inclination of the upper and lower walls of the case are provided with kerfs such as 10a so that the front may be resiliently held on the case without the use of screws. It will be noted that sides 5 and 6 of the case are provided with struck-out stops 5a and 6a against which portions of the glass 8 rests when the front is mounted on the case.

The thermometer tube 4 is in part held in position by the graduated scale plates 12 which rest on and are screwed to the upset parts 13 of the rear surfaces 2 and 3. It will be noted that the edges of the graduated scale plates 12 abut against the beveled faces of the lens front of the stem 4, and in this manner the graduations are brought very close to the mercury column, and at the same time the graduated scale plates serve to reduce the internal light reflections within the glass stem.

At the lower end of the case there is provided an enlarged portion 14 which serves as a mounting for the protective stem 15 enclosing the angular portion 4a of the tube and the bulb 4b. This enlargement is shown as being of a hemispherical form, although it will be understood that it may assume various shapes which will give an attractive appearance to the thermometer case and still provide sufficient space within the enlargement to afford a proper connection for the protective stem. The contours of the enlargement 14 which are believed to be most satisfactory, are those generated by the rotation of a conic curve, although various other shapes of enlargements will be obvious to those skilled in this art. The stem 15 has a reduced head 16 passing through an opening in the flat face 18 of the enlargement 14, in which position it is retained by its slabbed side and by lock nut 17. As is well-known, the stem provides protection for the bulb 4b and the lower portion of the thermometer tube 4a.

As herein shown, the case 1 may be punched or stamped from sheet metal, but it will be appreciated that it may be made of cast metal or molded composition material, provided the enlargement has the general contour indicated in heavy lines in Figs. 5 and 6, and provided that the thickness of the material of the enlargement is such that it may be drilled and tapped to receive and engage the screw-threaded head 16 of the stem. It will be understood, however, from Figs. 5 and 6 that the stamped, sheet metal case is first formed to have a generally hemispherical contour and thereafter, it is further formed in a separate operation to have a perforated flat face such as 18 at the desired angle. Thus the case is adapted for manufacture into an infinite number of angular combinations with respect to the stem 15, merely by forming a flat perforated face 18 on any part of the surface of the enlargement to give the desired angle of inclination. In Fig. 5 there are indicated three different possible inclinations of the bulb chamber with respect to the scale case in a plane perpendicular to the thermometer front, and in Fig. 6 there are indicated three different possible inclinations with respect to the plane of the thermometer front.

In Fig. 7 there is indicated a modified form of enlargement 14, the contour of which is defined by a plurality of plane surfaces which are generally tangent to a portion of a geometric shell generated by the rotation of a conic curve.

In order to define broadly the various forms of enlargement 14 contemplated by this invention, the term "convex shell" is employed and is intended to cover any thermometer case which has a portion so shaped that a stem may be attached thereto at any one of a plurality of angles.

From the foregoing it will be appreciated that a supply of thermometer scale cases with enlargements 14 having the shape shown in full lines in Figs. 5 and 6 may be kept in stock, and when it is desired to make any kind of angle thermometer, the enlargement may be perforated and formed with a flat surface 18 to afford the desired inclination between the scale case and the bulb chamber.

The present disclosure is merely typical of two possible forms of scale case, which are universally adaptable to a large number of angle thermometers having different degrees of inclination, but it will be understood that there may be many modifications and variations of the present arrangement within the scope of the appended claims without departing from the spirit of the present invention.

I claim:
1. A stage in the method of manufacturing a thermometer which comprises making a scale case provided with a hollow imperforate enlargement at its lower end, forming a flattened surface on said enlargement, making an opening through said enlargement at said flattened surface and attaching a protecting stem to said enlargement in registry with said opening.

2. A stage in the method of manufacturing a thermometer which comprises making a scale case provided with an imperforate enlargement in the form of a convex shell, making an opening in said shell at any desired point of several possible points thereon determined by the desired angular relation between said case and a protecting stem, and attaching said protecting stem to said shell in registry with said opening.

3. A stage in the method of manufacturing an angle thermometer which comprises stamping from sheet metal a scale case having an integral imperforate hemispherical enlargement at its lower end, perforating the material of said enlargement at any desired point thereon corresponding to the desired angular relation between the scale case and a protecting stem, and attaching said protecting stem to said enlargement in registry with said opening.

4. In a thermometer, a scale case provided near its end with an enlargement in the form of a convex shell, said enlargement being made of such shape as to admit of the ready formation of an opening therethrough at any one of a plurality of possible positions thereon, a protecting stem attached to said shell in registry with said opening, and a glass thermometer tube having a portion supported in said scale case and a second portion extending through said shell into said protecting stem, the shape of said enlargement being such that the edges of all possible stem openings therein are in planes perpendicular to a line passing through the principal axis of the first mentioned portion of said thermometer tube.

5. In a thermometer, a scale case provided near its lower end with an enlargement, the outer surface of said enlargement except for a connecting area being generated by the rotation of a conic curve and the material of said enlargement being such as to enable the formation of a connecting area with an opening therein at any one of a plurality of possible locations on said surface, a protecting stem attached to said enlargement at said connecting area, and a glass thermometer tube contained in said case and said protecting stem.

6. In a thermometer, a scale case provided near its lower end with an integral enlargement, the outer surface of said enlargement being substantially hemispherical, said enlargement being formed of such material as to admit of the ready formation of an opening through any selected portion thereof, a protecting stem attached to said enlargement, and a glass thermometer tube contained in said case and said protecting stem.

7. In a thermometer, a scale case provided near its lower end with an integral enlargement, the outer surface of said enlargement except for a connecting area being substantially hemispherical, said enlargement being made of such material as to admit of the ready formation of a connecting area at any selected portion thereof, a protecting stem attached to said enlargement at said connecting area, and a glass angle thermometer tube located substantially at the center of said hemisphere.

8. In a thermometer, a scale case provided near its lower end with an enlargement in the form of a convex shell, said shell being defined by a plurality of plane surfaces inclined to one another, and being made of such material as to admit of the ready formation of an opening through any selected surface thereof, a protecting stem for attachment in an opening formed in one of the faces of said shell, and a glass thermometer tube for said case and said stem.

9. In a thermometer, a scale case provided at its lower end with an enlargement in the form of a convex shell, the surface of which is formed by a plurality of plane areas tangent to a surface defined by the rotation of a conic curve, said enlargement being formed of such material as to admit of the ready formation of an opening through any selected one of said plane areas, a protecting stem attached to said shell in registry with said opening, and a thermometer tube contained in said case and said protecting stem.

10. In a thermometer scale case comprising a long narrow portion and provided near one end with an enlargement, certain of the opposing edges of said case being inclined outwardly, and a thermometer front for closing said scale case, said front including a frame having a protective glass mounted therein, said frame being provided with flanges conforming to the contour of the edges of said case, certain of said flanges being provided with kerfs.

11. A stage in the method of manufacturing an angle thermometer which comprises stamping from sheet metal a scale case having an imperforate enlargement at its lower end, perforating the material of said enlargement at any desired point thereon corresponding to the desired angular relation between the scale case and a protecting stem, and attaching said protecting stem to said enlargement in registry with said opening.

ERICH BANDOLY.